United States Patent
Doba et al.

(10) Patent No.: US 9,208,372 B2
(45) Date of Patent: Dec. 8, 2015

(54) IMAGE PROCESSING APPARATUS, IMAGE PROCESSING METHOD, PROGRAM, AND ELECTRONIC APPLIANCE

(71) Applicant: Sony Corporation, Tokyo (JP)

(72) Inventors: Kentaro Doba, Kanagawa (JP); Yota Komoriya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/242,248

(22) Filed: Apr. 1, 2014

(65) Prior Publication Data

US 2014/0307954 A1 Oct. 16, 2014

(30) Foreign Application Priority Data

Apr. 11, 2013 (JP) ................................. 2013-082881

(51) Int. Cl.
*G06K 9/00* (2006.01)
*H04N 13/00* (2006.01)

(52) U.S. Cl.
CPC ........ *G06K 9/00201* (2013.01); *H04N 13/0022* (2013.01)

(58) Field of Classification Search
CPC ..... G06K 9/00201; G06T 19/00; G06T 17/20
USPC .................. 382/154, 173, 190, 106; 345/419; 348/43

See application file for complete search history.

(56) References Cited

U.S. PATENT DOCUMENTS

2012/0139902 A1* 6/2012 Fujisawa et al. .............. 345/419
2012/0147139 A1* 6/2012 Li et al. .......................... 348/43
2014/0232820 A1* 8/2014 Ha et al. ......................... 348/43

FOREIGN PATENT DOCUMENTS

JP 444066 1/2010

* cited by examiner

Primary Examiner — Ruiping Li
(74) Attorney, Agent, or Firm — Dentons US LLP (57) ABSTRACT

There is provided an image processing apparatus including an image processing unit configured to carry out adjustment that makes disparity larger than disparity corresponding to processed images, which are moving images to be processed, based on an amount of change over time in a magnitude of the disparity corresponding to the processed images.

9 Claims, 5 Drawing Sheets

IMAGE PROCESSING APPARATUS, IMAGE PROCESSING METHOD, PROGRAM, AND ELECTRONIC APPLIANCE

CROSS REFERENCE TO RELATED APPLICATIONS

This application claims the benefit of Japanese Priority Patent Application JP 2013-082881 filed Apr. 11, 2013, the entire contents of which are incorporated herein by reference.

BACKGROUND

The present disclosure relates to an image processing apparatus, an image processing method, a program, and an electronic appliance.

Apparatuses capable of displaying images corresponding to the user's left eye (hereinafter indicated as "left-eye images") and images corresponding to the user's right eye (hereinafter indicated as "right-eye images") on a display screen so as to have the user recognize the displayed images as three-dimensional images are becoming increasingly widespread. An apparatus such as that described above enables the user to recognize the displayed images as three-dimensional images by using disparity.

When having a user recognize displayed images as three-dimensional images, it is preferable to present the left-eye images to only the user's left eye and to present the right-eye images to only the user's right eye. If the user were to recognize the left-eye images with his/her right eye and/or to recognize the right-eye images with his/her left eye, that is, if a phenomenon called crosstalk were to occur, there will be a drop in the quality of the three-dimensional images, such as the images appearing to be superimposed images or the images appearing to be blurred.

Due to this situation, technologies for reducing crosstalk are being developed. One example of a technology for reducing crosstalk is the technology disclosed in JP 4440066B.

SUMMARY

As one example, the technology disclosed in JP 4440066B adjusts disparity in accordance with the size of the display apparatus to display the three-dimensional images. However, even if the technology disclosed in JP 4440066B is used, it is not possible to adjust disparity in accordance with the images to be displayed on the display screen.

The present disclosure aims to provide a novel and improved image processing apparatus, image processing method, program, and electronic appliance that are capable of adjusting disparity based on the processed images.

According to an embodiment of the present disclosure, there is provided an image processing apparatus including an image processing unit configured to carry out adjustment that makes disparity larger than disparity corresponding to processed images, which are moving images to be processed, based on an amount of change over time in a magnitude of the disparity corresponding to the processed images.

According to an embodiment of the present disclosure, there is provided an image processing method including carrying out adjustment to make disparity larger than disparity corresponding to processed images, which are moving images to be processed, based on an amount of change over time in a magnitude of the disparity corresponding to the processed images.

According to an embodiment of the present disclosure, there is provided a program causing a computer to execute adjustment that makes disparity larger than disparity corresponding to processed images, which are moving images to be processed, based on an amount of change over time in a magnitude of the disparity corresponding to the processed images.

According to an embodiment of the present disclosure, there is provided an electronic appliance including an image processing unit configured to carry out adjustment that makes disparity larger than disparity corresponding to processed images, which are moving images to be processed, based on an amount of change over time in a magnitude of the disparity corresponding to the processed images.

According to one or more embodiments of the present disclosure, it is possible to adjust disparity based on the processed images.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be given in the order indicated below.

1. Image Processing Method According to an Embodiment of the Present Disclosure
2. Image Processing Apparatus According to an Embodiment of the Present Disclosure
3. Program According to an Embodiment of the Present Disclosure 1. Image Processing Method According to an Embodiment of the Present Disclosure An image processing method according to an embodiment of the present disclosure will be described first before describing the configuration of the image processing apparatus according to an embodiment of the present disclosure. The image processing method according to the present embodiment is described by way of an example where an image processing apparatus according to an embodiment of the present disclosure carries out processing according to the image processing method according to the present embodiment.

The image processing apparatus according to the present embodiment adjusts disparity corresponding to processed images (which are moving images to be processed) based on the disparity corresponding to such processed images. As processing according to the image processing method according to the present embodiment, the image processing apparatus according to the present embodiment carries out adjustment to make the disparity larger than the disparity corresponding to the processed images based on an amount of change over time in the magnitude of the disparity corresponding to the processed images.

Here, moving images showing the left-eye images and right-eye images (hereinafter sometimes referred to as "stereo images") that construct three-dimensional images and stereo images that have been artificially generated from a flat image (2D image) can be given as examples of the processed images according to the present embodiment. Hereinafter, stereo images and stereo images that have been artificially generated are collectively referred to as "stereo images".

Also, the magnitude of the disparity corresponding to the processed images for the present embodiment is expressed for example by an amount of disparity in the images (hereinafter, referred to as "frame images") corresponding to the respective frames in the processed images. The amount of disparity according to the present embodiment is calculated for each frame image based on the degree of depth of each pixel in the respective frame images, for example. Note that processing relating to the calculation of the amount of disparity by the image processing apparatus according to the present embodiment will be described later.

Processing According to the Image Processing Method According to the Present Embodiment Processing according to the image processing method according to the present embodiment will now be described in more detail.

(1) Disparity Amount Calculating Process

The image processing apparatus according to the present embodiment calculates the amount of disparity for each frame image based on the degree of depth of each pixel relating to the disparity in the respective frame images. Hereinafter, the degree of depth of each pixel in the respective frame images will sometimes be referred to as a "disparity map".

As one example, the image processing apparatus according to the present embodiment calculates the disparity of each pixel by comparing corresponding pixels in the left-eye image and the right-eye image that construct a stereo image. The image processing apparatus according to the present embodiment then carries out the disparity amount calculating process according to the present embodiment by setting the calculated disparity of each pixel as the degree of depth of each pixel in the respective frame images according to the present embodiment. Here, the degree of depth according to the present embodiment corresponds to the distance between the viewpoints.

Note that for the image processing apparatus according to the present embodiment, the method of acquiring the degree of depth of each pixel in the respective frame images according to the present embodiment is not limited to the above.

For example, the image processing apparatus according to the present embodiment may calculate the disparity of each pixel using an arbitrary method that is capable of calculating the disparity of each pixel.

As another example, it is also possible for the image processing apparatus according to the present embodiment to use disparity information showing the disparity of each pixel in the respective frame images corresponding to the processed images according to the present embodiment, and to set the disparity of each pixel shown by the disparity information as the degree of depth of the respective pixels in the respective frame images according to the present embodiment. Here, as examples, the disparity information according to the present embodiment may be metadata of the processed images according to the present embodiment or may be data that is separate to the processed images according to the present embodiment. As examples, the disparity of each pixel in the respective frame images shown by the disparity information according to the present embodiment may be set by analyzing the processed images according to the present embodiment, or may be set based on a user operation or the like. The disparity information according to the present embodiment is generated before execution of the processing according to the image processing method according to the present embodiment in an apparatus that is external to the image processing apparatus according to the present embodiment or in the image processing apparatus according to the present embodiment itself, for example.

The image processing apparatus according to the present embodiment calculates an amount of disparity in each frame image by calculating the dynamic range of the disparity map (the degree of depth in the respective frame images), for example.

As a specific example, the image processing apparatus according to the present embodiment calculates the amount of disparity in each frame image by carrying out Equation 1 below for each frame. Here, "z(t)" in Equation 1 represents the amount of disparity in the frame images of frame t (where t is an integer of one or higher). Also, "D(x,y,t)" in Equation 1 represents the degree of depth of a pixel expressed by coordinates (x,y) in the frame images of frame t. The coordinates in the frame images are expressed with an arbitrary position in the frame images as the origin (as examples, the position of the lower left corner of the frame images, or the position of the upper left corner of the frame images).

$$z(t) = \max_{(x,y)} D(x, y, t) - \min_{(x,y)} D(x, y, t) \qquad \text{(Equation 1)}$$

Note that the amount of disparity according to the present embodiment is not limited to the dynamic range of the disparity map (the degree of depth in the respective frame images).

As one example, the image processing apparatus according to the present embodiment may calculate the amount of disparity in each frame image by calculating a maximum value of the degree of depth in the respective frame images or an average value of the degree of depth in the respective frame images.

(2) Disparity Adjusting Process

When the amount of disparity in each frame image has been calculated in the processing in (1) (disparity amount calculating process) described above, the image processing apparatus according to the present embodiment carries out adjustment to make the amount of disparity in each frame image larger based on the amount of change over time in the amount of disparity. As one example, the image processing apparatus according to the present embodiment increases the amount of disparity in a frame image when the calculated amount of disparity in each frame image has suddenly increased in excess of a set increase amount (or by a set increase amount or more).

As a specific example, the image processing apparatus according to the present embodiment carries out adjustment to make the amount of disparity in each frame image larger based on the amount of disparity in each frame image and an overshoot function that is a function which has the calculated amount of disparity in each frame image as an input.

Here, the expression "overshoot function" according to the present embodiment is a function that has the amount of disparity in each frame image as an input value and is a function that holds an amount of change in the amount of disparity one frame ago and causes convergence with the amount of disparity in each frame image as the target value. The overshoot function according to the present embodiment acts so that changes in the amount of disparity are correlated over time.

As one example, the image processing apparatus according to the present embodiment adjusts the calculated amount of disparity in each frame image by carrying out the calculation in Equation 2 below. The right side of Equation 2 is one example of the overshoot function according to the present embodiment. In the overshoot function shown on the right side in Equation 2, the adjusted amount of disparity in a frame image is decided by the balance between the two elements below.

Convergence to the target value "z(t)"
Maintaining the amount of change "dz'(t)/dt|$_{t=t-1}$" of one frame ago (the immediately preceding frame)

$$z'(t) = z'(t-1) + \left[ (1-\alpha) \cdot \{z(t) - z'(t-1)\} + \alpha \cdot \frac{dz'(t)}{dt}\bigg|_{t=t-1} \right] \quad \text{(Equation 2)}$$

Here, "z(t)" in Equation 2 represents the amount of disparity in the frame images of frame t and is an input into the overshoot function for frame t. Also, "z'(t)" in Equation 2 represents the adjusted amount of disparity in the frame images of frame t and is the output of the overshoot function for frame t. Also, "z'(t−1)" in Equation 2 shows the adjusted amount of disparity in the frame images of frame (t−1).

Also, "α" (where 0<α<1) in Equation 2 is a constant that controls the strength of the correlation with changes in the amount of disparity. When the value of α is large, the time (overshoot time) for which the amount of disparity is to be enhanced more than the amount of disparity in the frame images becomes longer, while when the value of α is small, the time for which the amount of disparity is to be enhanced more than the amount of disparity in the frame images becomes shorter. For example, if the value of α is set at 0.85, the amount of disparity is enhanced more than the amount of disparity in the frame images for around 7 to 8 frames. Note that it should be obvious that the value of α according to the present embodiment is not limited to 0.85. As one example, the value of α according to the present embodiment may be set as appropriate according to a user operation or the like.

Figure 1:
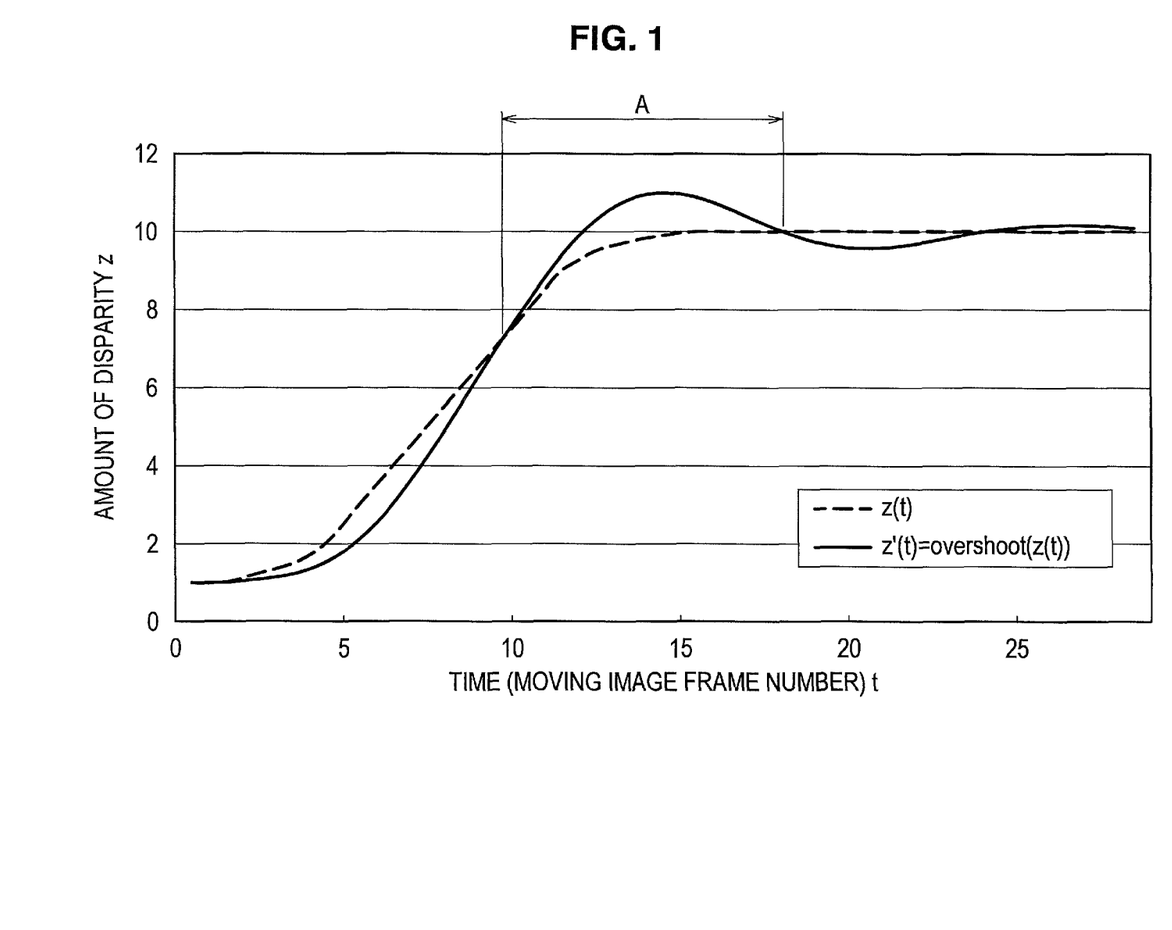
FIG. 1 is an explanatory diagram showing processing according to an image processing method according to an embodiment of the present disclosure.

FIG. 1 is an explanatory diagram showing the processing according to the image processing method according to the present embodiment. FIG. 1 shows an example of the relationship between the input into the overshoot function shown in Equation 2 above (i.e., z(t), which is the amount of disparity in the frame images corresponding to each frame in the processed images) and the output of the overshoot function shown in Equation 2 above (i.e., z'(t), which is the adjusted amount of disparity in the frame images corresponding to each frame in the processed images). Here, FIG. 1 shows an example of the relationship between the input of the overshoot function and the output of the overshoot function for a case where the value of α is set at 0.85.

As one example, as indicated by the part marked A in FIG. 1, the image processing apparatus according to the present embodiment uses the overshoot function shown in Equation 2 above to enhance the amount of disparity more than the amount of disparity in the frame images.

Figure 2:
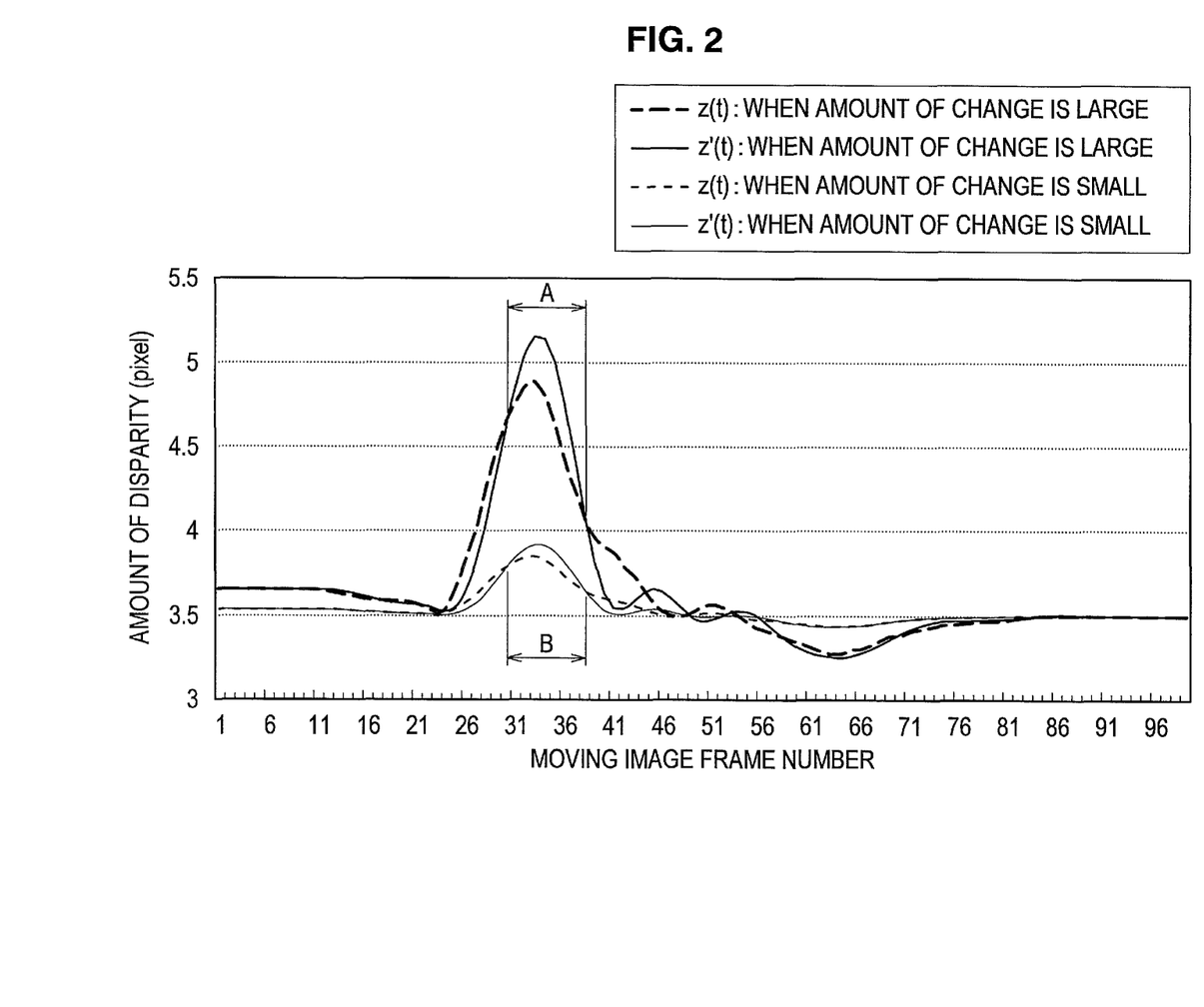
FIG. 2 is an explanatory diagram showing processing according to an image processing method according to an embodiment of the present disclosure.

FIG. 2 is an explanatory diagram showing the processing according to the image processing method according to the present embodiment. FIG. 2 shows another example of the relationship between the input into the overshoot function shown in Equation 2 above (i.e., z(t), which is the amount of disparity in the frame images corresponding to each frame in the processed images) and output of the overshoot function shown in Equation 2 above (i.e., z'(t), which is the adjusted amount of disparity in the frame images corresponding to each frame in the processed images). Here, FIG. 2 shows an example of the relationship between the input into the overshoot function and the output of the overshoot function for a case where processed images in which the amount of change in the amount of disparity is large are to be processed (indicated as "large amount of change" in FIG. 2) and an example of the relationship between the input into the overshoot function and the output of the overshoot function for a case where processed images in which the amount of change in the amount of disparity is small are to be processed (indicated as "small amount of change" in FIG. 2).

As one example, as shown by FIGS. 2A and 2B, it can be understood that by using the overshoot function shown in Equation 2 above, the image processing apparatus according to the present embodiment enhances the amount of disparity compared to the amount of disparity in the frame images regardless of the magnitude of the amount of change in the amount of disparity in the processed images to be processed.

By using an overshoot function, such as that shown in Equation 2 above for example, that has the amount of disparity in the frame images corresponding to the respective frames in the processed images as an input value above, the image processing apparatus according to the present embodiment carries out adjustment to make the amount of disparity in each frame image larger based on the amount of change over time in the amount of disparity. Note that it should be obvious that the overshoot function according to the present embodiment is not limited to the function shown in Equation 2 above.

Once adjustment has been carried out to increase the amount of disparity in each frame image by using an overshoot function such as that shown in Equation 2 above, the image processing apparatus according to the present embodiment adjusts the degree of depth of each pixel in the respective frame images based on the adjusted amount of disparity in each frame image.

As one example, the image processing apparatus according to the present embodiment calculates the ratio of the output of the overshoot function to the value of the input of the overshoot function for each frame image. The image processing apparatus according to the present embodiment then adjusts the degree of depth of each pixel in the respective frame images by multiplying, for each frame image, the degree of depth of each pixel in the frame image and the calculated value of the ratio.

More specifically, the image processing apparatus according to the present embodiment adjusts the degree of depth of each pixel in the respective frame images by carrying out the calculation shown in Equation 3 below, for example. Here, the calculation shown in Equation 3 below corresponds to calculation that uses the difference between the adjusted amount of disparity in a frame image and the amount of disparity in the frame image before adjustment.

$$\hat{P}(t) = \left\{ \frac{z'(t)}{z(t)} \right\}^k \cdot P(t) \quad \text{(Equation 3)}$$

Here, the expression "P(t)" in Equation 3 represents the degree of depth (the distance between viewpoints) of each pixel in the frame images of frame t. Also, the expression "P^(t)" in Equation 3 represents the degree of depth of each pixel in the adjusted frame images of frame t.

Also, the expression "k" (where k>0) in Equation 3 is a constant for adjusting the degree of enhancement for enhancing the degree of depth of each pixel in the frame images. If the value of k is set large, the degree of depth of each pixel in the frame image is enhanced more strongly. If the value of k is set small, the degree of depth of each pixel in the frame image is not enhanced very much. The case where k=2 can be given as an example of the value of k where enhancement of the degree of depth of each pixels in the frame images can be perceived by the user watching the images but where such user does not experience discomfort due to the perceived enhancement of the degree of depth of each pixel in the frame images. Note that it should be obvious that the value of k according to the present embodiment is not limited to 2. Also, the value of k according to the present embodiment may be set as appropriate according to a user operation, for example.

As shown in Equation 3 above, for example, the image processing apparatus according to the present embodiment adjusts the degree of depth of each pixel in the respective frame images using the ratio of the output value of the overshoot function to the input value of the overshoot function.

Here, the ratio of the output value of the overshoot function to the input value of the overshoot function is a value based on the amount of change over time in the magnitude of the disparity corresponding to the processed images. Accordingly, by adjusting the degree of depth of each pixel in the respective frame images according to the calculation shown in Equation 3 above, for example, the image processing apparatus according to the present embodiment is capable of carrying out adjustment to make the disparity larger than the disparity corresponding to the processed images.

Note that the disparity adjusting process according to the present embodiment is not limited to the example described above.

As one example, if the amount of disparity in each frame image is adjusted so as to increase using an overshoot function such as that shown in Equation 2 above, there is the risk that the amount of disparity will fluctuate, such as when the amount of disparity is repeatedly enhanced and reduced, due to the occurrence of ringing.

For this reason, the image processing apparatus according to the present embodiment selectively updates the output value of the overshoot function as shown in Equation 2 above so as to act only in the direction where the amount of disparity in each frame image is adjusted so as to increase.

More specifically, as shown in Equation 4 below for example, if the output value (z'(t)) of the overshoot function is smaller than the input value (z(t)) of the overshoot function, the image processing apparatus according to the present embodiment selectively updates the output value of the overshoot function to the input value of the overshoot function. Here, the expression "Z^(t)" in Equation 4 represents the output value of the overshoot function that has been selectively updated.

$$\hat{Z}(t) = \begin{cases} z'(t) & (z'(t) \geq z(t)) \\ z(t) & (z'(t) < z(t)) \end{cases} \quad \text{(Equation 4)}$$

Also, if the output value of the overshoot function has been selectively updated, the image processing apparatus according to the present embodiment calculates the ratio of the output value of the overshoot function that has been selectively updated to the input value of the overshoot function for each frame image, for example. The image processing apparatus according to the present embodiment then adjusts the degree of depth of the each pixel in the respective frame images by multiplying, for each frame image, the degree of depth of the each pixel in the frame images and the calculated value of the ratio.

More specifically, the image processing apparatus according to the present embodiment adjusts the degree of depth of each pixel in the respective frame images by carrying out the calculation shown in Equation 5 below, for example.

$$\hat{P}(t) = \left\{ \frac{\hat{Z}(t)}{z(t)} \right\}^k \cdot P(t) \quad \text{(Equation 5)}$$

As shown in Equation 4 above for example, when the output value of the overshoot function is equal to or larger than the input value of the overshoot function due to the output value of the overshoot function being selectively updated, the output value of the overshoot function will be used, while when the output value of the overshoot function is smaller than the input value of the overshoot function, the input value of the overshoot function will be used.

Accordingly, as one example, by selectively updating the output value of the overshoot function as shown in Equation 4 above and adjusting the degree of depth of each pixel in the respective frame images as shown in Equation 5 above, the image processing apparatus according to the present embodiment is capable of preventing fluctuation in the amount of disparity due to the occurrence of ringing and an unnatural weakening of the amount of disparity, for example.

Figure 3:
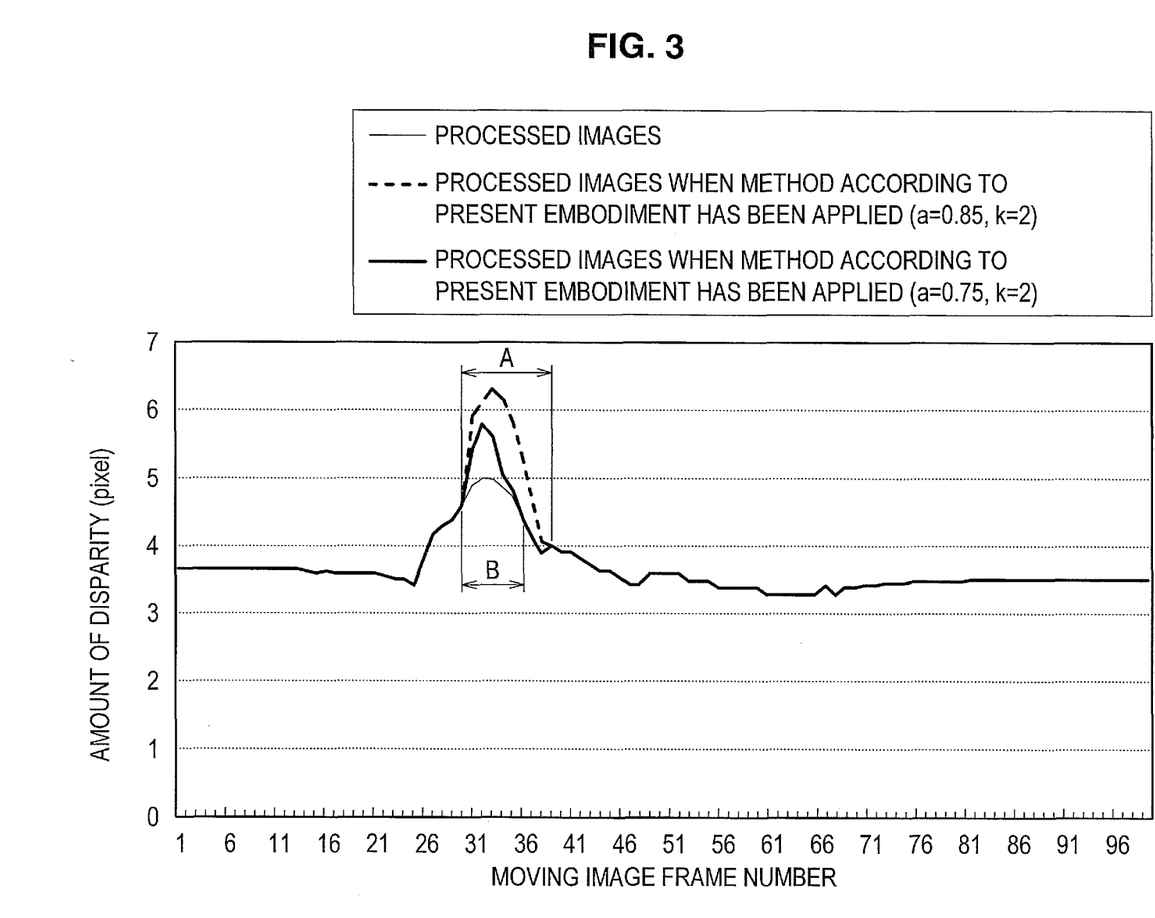
FIG. 3 is an explanatory diagram showing processing according to an image processing method according to an embodiment of the present disclosure.

FIG. 3 is an explanatory diagram showing processing according to the image processing method according to the present embodiment. FIG. 3 shows an example of the amount of disparity in the processed images and the amount of disparity in the processed images that have been adjusted by the processing according to the image processing method according to the present embodiment. Here, FIG. 3 shows an example of the amount of disparity in the adjusted processed images in a case where the image processing apparatus according to the present embodiment has carried out a disparity adjusting process that uses the calculation shown in Equation 5 above for example.

As examples, as shown by the parts marked A and B in FIG. 3, by carrying out the processing according to the image processing method according to the present embodiment, disparity is adjusted so as to become larger than the disparity corresponding to the processed images based on the amount of change over time in the magnitude of the disparity corresponding to the processed images. Also, as shown in FIG. 3, for example, by changing the value of α, the time for which the amount of disparity is enhanced (the overshoot time) changes.

As one example of the processing according to the image processing method according to the present embodiment, the image processing apparatus according to the present embodiment carries out the processing in (1) above (the disparity amount calculating process) and the processing in (2) above (the disparity adjusting process).

Here, in the processing in (2) above (the disparity adjusting process) the image processing apparatus according to the present embodiment adjusts the degree of depth of each pixel in the respective frame images by way of the calculation shown in Equation 3 and Equation 5 above, for example, based on the amount of disparity in each frame image that has been adjusted based on the amount of disparity in each frame image calculated by the processing in (1) above (the disparity amount calculating process). Also, the amount of disparity in each frame image that has been adjusted based on the amount of disparity in each frame image calculated by the processing in (1) above (the disparity amount calculating process) is a value based on the amount of change over time in the magnitude of the disparity corresponding to the processed images and as examples is the output value of the overshoot function as shown in Equation 2 above or the output value of the overshoot function that has been selectively updated as shown in Equation 4 above, for example.

Accordingly, by carrying out the processing in (1) above (the disparity amount calculating process) and the processing in (2) above (the disparity adjusting process), for example, as the processing according to the image processing method according to the present embodiment, the image processing apparatus according to the present embodiment is capable of carrying out adjustment to make the disparity larger than the disparity corresponding to the processed images.

Also, by carrying out adjustment to make the disparity corresponding to the processed images larger based on the amount of change over time in the magnitude of the disparity corresponding to the processed images, the disparity corresponding to the processed images is temporarily enhanced as shown in part A in FIG. 3 for example. Accordingly, the image processing apparatus according to the present embodiment is capable of producing favorable sense of depth in the content shown by the processed images.

Since the image processing apparatus according to the present embodiment carries out adjustment to make the disparity corresponding to the processed images larger based on the amount of change over time in the magnitude of the disparity corresponding to the processed images, it is possible for the user who views the adjusted processed images to experience a greater three-dimensional depth, even where no great disparity is applied to the processed images due to reasons such as crosstalk at the display device that displays images on a display screen.

In addition, in the case where the image processing apparatus according to the present embodiment adjusts the degree of depth of each pixel in the respective frame images by way of the calculation shown in Equation 5 above for example in the processing in (2) above (the disparity adjusting process), the image processing apparatus according to the present embodiment is capable for example of preventing fluctuation in the amount of disparity due to ringing and an unnatural weakening in the amount of disparity. Accordingly, in the case described above, the image processing apparatus according to the present embodiment is capable of improving the three-dimensional depth experienced by the user watching the processed images that have been adjusted.

Note that the processing according to the image processing method according to the present embodiment is not limited to the processing in (1) above (the disparity amount calculating process) and the processing in (2) above (the disparity adjusting process).

As one example, the image processing apparatus according to the present embodiment is also capable of detecting, by way of motion detection processing or the like using a plurality of frame images, a change in the depth direction of an object included in the processed images as the magnitude of the disparity in units of a plurality of pixels or pixel units that show the object and of carrying out adjustment to make the disparity larger than the disparity corresponding to the processed images based on the amount of change over time in the magnitude of the disparity shown by such detection result.

Specific Example of Processing According to Image Processing Method According to the Present Embodiment Next, a specific example of the processing according to the image processing method according to the present embodiment described above will be described.

Figure 4:
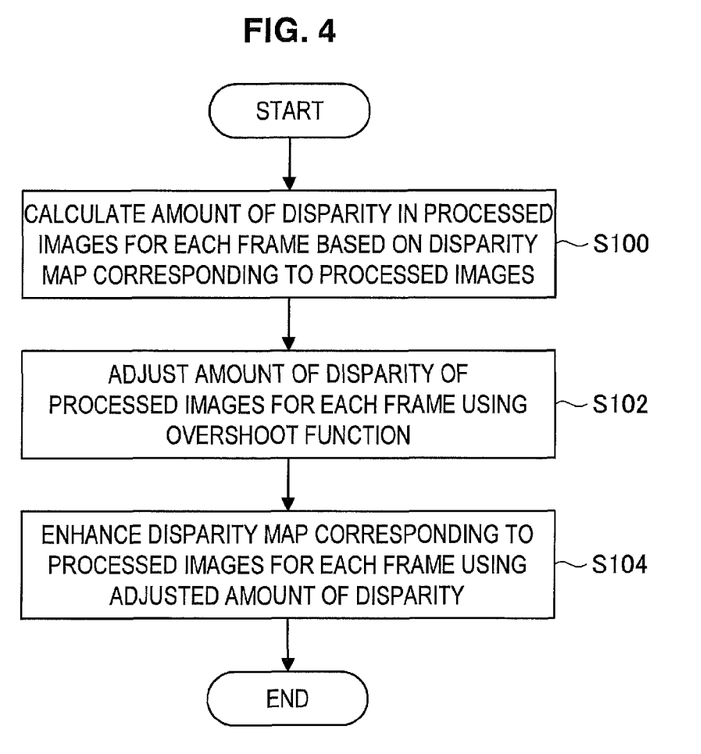
FIG. 4 is a flowchart useful in explaining processing according to an image processing method according to the present embodiment.

FIG. 4 is a flowchart useful in explaining an example of the processing according to the image processing method according to the present embodiment. Here, step S100 shown in FIG. 4 corresponds to the processing in (1) above (the disparity amount calculating process). The processing in step S102 and S104 shown in FIG. 4 corresponds to the processing in (2) above (the disparity adjusting process).

The image processing apparatus according to the present embodiment calculates the amount of disparity in the processed images for each frame based on a disparity map corresponding to the processed images (S100). As examples, the image processing apparatus according to the present embodiment calculates the dynamic range of the disparity map for each frame image, the maximum value of the disparity map for each frame image, or the average value of the disparity map for each frame image as the amount of disparity in the processed images.

Once the amount of disparity in the processed images has been calculated for each frame in step S100, the image processing apparatus according to the present embodiment adjusts the amount of disparity in the processed images for each frame using the overshoot function (S102). As examples, the image processing apparatus according to the present embodiment adjusts the amount of disparity in the processed images for each frame by using an overshoot function such as that shown in Equation 2 above or by selectively updating the value of the output of the overshoot function as shown in Equation 4 above.

Once the amount of disparity in the processed images has been adjusted for each frame in step S102, the image processing apparatus according to the present embodiment enhances the disparity map corresponding to the processed images for each frame (S104). As examples, the image processing apparatus according to the present embodiment enhances the disparity map corresponding to the processed images for each frame by carrying out the calculation shown in Equation 3 above or the calculation shown in Equation 5 above.

As the processing according to the image processing method according to the present embodiment, the image processing apparatus according to the present embodiment carries out the processing shown in FIG. 4 for example. By carrying out the processing shown in FIG. 4 for example, the processing in (1) above (the disparity amount calculating process) and the processing in (2) above (the disparity adjusting process) are realized.

Accordingly, by carrying out the processing shown in FIG. 4 for example, the image processing apparatus according to the present embodiment is capable of adjusting disparity based on the processed images. Also, by carrying out the processing shown in FIG. 4 for example, the image processing apparatus according to the present embodiment is capable of achieving the effects that can be achieved by using the image processing method according to the present embodiment described earlier. Note that it should be obvious that the processing according to the image processing method according to the present embodiment is not limited to the processing shown in FIG. 4.

Image Processing Apparatus According to the Present Embodiment

Next, an example configuration of an image processing apparatus according to the present embodiment that is capable of carrying out the processing according to the image processing method according to the present embodiment described earlier will be described.

Figure 5:
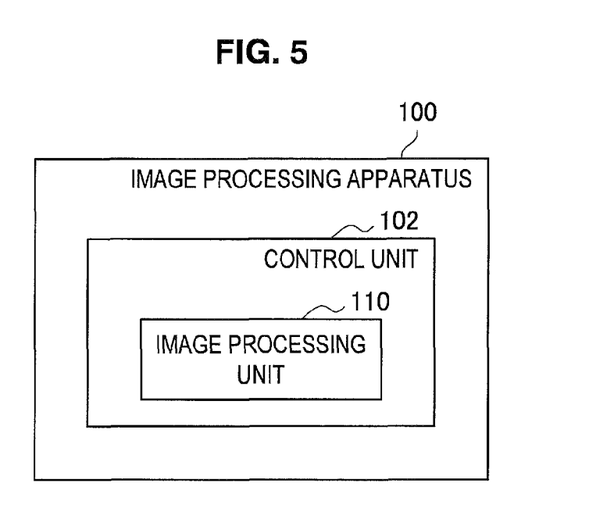
FIG. 5 is a block diagram showing one example configuration of an image processing apparatus according to an embodiment of the present disclosure.

FIG. 5 is a block diagram showing one example configuration of an image processing apparatus 100 according to the present embodiment. The image processing apparatus 100 includes a control unit 102, for example.

Also, as examples, the image processing apparatus 100 may include a ROM (Read Only Memory, not shown), a RAM (Random Access Memory, not shown), a storage unit (not shown), a communication unit (not shown), an operation unit (not shown) that can be operated by the user, and a display unit (not shown) that displays various screens on a display screen. In the image processing apparatus 100, the various component elements described above are connected by a bus as a data transfer path, for example.

Here, the ROM (not shown) stores a program and control data, such as computation parameters, used by the control unit 102. The RAM (not shown) temporarily stores a program or the like being executed by the control unit 102.

The storage unit (not shown) is a storage device provided in the image processing apparatus 100 and stores various data, for example, image data showing the processed images, disparity information (data) corresponding to the processed images, and applications. Here, a magnetic recording medium such as a hard disk drive and a nonvolatile memory such as flash memory can be given as examples of the storage unit (not shown). The storage unit (not shown) may be detachable from the image processing apparatus 100.

A communication interface, described later, can be given as an example of the communication unit (not shown). Also, an operation input device, described later, can be given as an example of the operation unit (not shown), and a display device, described later, can be given as an example of the display unit (not shown).

Example Hardware Configuration of Image Processing Apparatus 100

Figure 6:
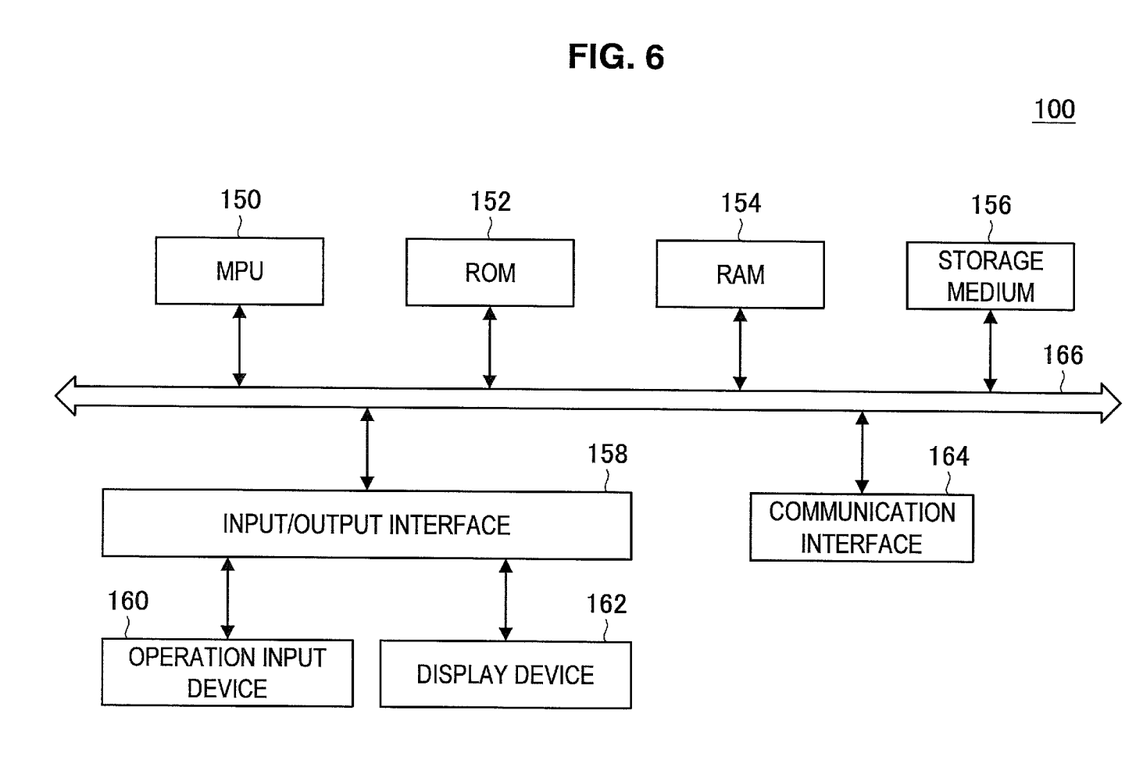
FIG. 6 is an explanatory diagram showing one example hardware configuration of the image processing apparatus according to the present embodiment.

FIG. 6 is an explanatory diagram showing an example hardware configuration of the image processing apparatus 100 according to the present embodiment. As one example, the image processing apparatus 100 includes an MPU 150, a ROM 152, a RAM 154, a storage medium 156, an input/output interface 158, an operation input device 160, a display device 162, and a communication interface 164. Also, in the image processing apparatus 100, as one example the respective component elements are connected by a bus 166 as a data transfer path.

The MPU 150 is composed for example of an MPU (Micro Processing Unit) or various types of processing circuits and functions as the control unit 102 that controls the entire image processing apparatus 100. In the image processing apparatus 100, as one example the MPU 150 also fulfills the role of the image processing unit 110, described later.

The ROM 152 stores programs, control data, such as computation parameters, and the like for use by the MPU 150. The RAM 154 temporarily stores a program to be executed by the MPU 150, for example.

The storage medium 156 functions as a storage unit (not shown), and as one example stores various data such as image data showing the processed images, disparity information corresponding to the processed images, and applications. Here, a magnetic recording medium such as a hard disk drive and a nonvolatile memory such as flash memory can be given as examples of the storage medium 156. The storage medium 156 may be detachable from the image processing apparatus 100.

The input/output interface 158 connects the operation input device 160 and the display device 162, for example. The operation input device 160 functions as an operation unit (not shown), and the display device 162 functions as a display unit (not shown). Here, a USB (Universal Serial Bus) terminal, a DVI (Digital Visual Interface) terminal, an HDMI (High-Definition Multimedia Interface) terminal, various processing circuits and the like can be given as examples of the input/output interface 158. As one example, the operation input device 160 is provided on the image processing apparatus 100 and is connected to the input/output interface 158 inside the image processing apparatus 100. A button or buttons, direction keys, and a rotary selector such as a jog dial, or a combination of the same can be given as examples of the operation input device 160. Also, as one example, the display device 162 is provided on the image processing apparatus 100 and is connected to the input/output interface 158 inside the image processing apparatus 100. A liquid crystal display, an organic EL (electro-luminescence) display, and an OLED (Organic Light Emitting Diode) display can be given as examples of the display device 162.

Note that it should be obvious that the input/output interface 158 may also be capable of connecting to external devices, such as an operation input device (as examples, a keyboard and a mouse) and a display device, as external apparatuses for the image processing apparatus 100. The display device 162 may also be a device, such as a touch screen, that is capable of both displaying and user operations.

The communication interface 164 is a communication device provided in the image processing apparatus 100 and functions as a communication unit (not shown) for carrying out wired or wireless communication via a network (or directly) with a display apparatus or an external apparatus such as a server. Here, a communication antenna and RF (Radio Frequency) circuit (for wireless communication), an IEEE 802.15.1 port and a transmission/reception circuit (for wireless communication), an IEEE 802.11b port and a transmission/reception circuit (for wireless communication), and a LAN (Local Area Network) terminal and a transmission/reception circuit (for wired communication) can be given as examples of the communication interface 164. Also, a wired network such as a LAN or a WAN (Wide Area Network), a wireless network such as a wireless LAN (WLAN) and a wireless WAN (WWAN) for communication via a base station, and the Internet that uses a communication protocol such as TCP/IP (Transmission Control Protocol/Internet Protocol) can be given as the network according to the present embodiment.

Using the configuration shown in FIG. 6, for example, the image processing apparatus 100 carries out the processing according to the image processing method according to the present embodiment. Note that the hardware configuration of the image processing apparatus 100 according to the present embodiment is not limited to the configuration shown in FIG. 6.

As one example, the image processing apparatus 100 may include an image pickup device that fulfills the role of an image pickup unit (not shown) that picks up moving images.

In the case where an image pickup device is provided, as one example the image processing apparatus 100 is also capable of processing picked-up images generated by image pickup by the image pickup device as the processed images.

Here, a lens/image pickup element and a signal processing circuit can be given as an example of the image pickup device according to the present embodiment. As one example, the lens/image pickup element is composed of lenses of an optical system and an image sensor that uses a plurality of image pickup elements such as CMOS (Complementary Metal Oxide Semiconductor). The signal processing circuit includes an AGC (Automatic Gain Control) circuit and an ADC (Analog to Digital Converter), for example, converts the analog signal generated by the image pickup elements to a digital signal (image data), and carries out various signal processing. White balance correction processing, color correction processing, gamma correction processing, YCbCr conversion processing, and edge enhancement processing can be given as examples of the signal processing carried out by the signal processing circuit.

Also, if the image processing apparatus 100 is configured to carry out processing in a standalone configuration, it is not necessary to provide the communication interface 164. Also, the image processing unit 110 can use a configuration that omits the storage medium 156, the operation input device 160, and the display device 162.

The explanation will now return to the example configuration of the image processing apparatus 100 shown in FIG. 5. The control unit 102 is composed of an MPU or the like and fulfills the role of controlling the entire image processing apparatus 100. As one example, the control unit 102 also includes the image processing unit 110 and fulfills the leading role of carrying out processing according to the image processing method according to the present embodiment.

The image processing unit 110 fulfills the leading role of carrying out processing according to the image processing method according to the present embodiment and carries out adjustment to make the disparity larger than the disparity corresponding to the processed images based on the amount of change over time in the magnitude of the disparity corresponding to the processed images. Here, moving images shown by image data read out from the storage unit (not shown) or an external storage medium that has been connected, moving images shown by image data received by the communication unit (not shown), and moving images picked up by the image pickup unit (not shown) can be given as examples of the processed images processed by the image processing unit 110.

As a specific example, the image processing unit 110 fulfills the leading role of carrying out the processing in (1) above (the disparity amount calculating process) and the processing in (2) above (the disparity adjusting process).

As one example, the image processing unit 110 calculates the amount of disparity in each frame image based on the degree of depth of each pixel in the respective frame images in the processed images. As examples, the image processing unit 110 calculates the dynamic range of the disparity map (the degree of depth of each pixel in the respective frame images), the maximum value of the disparity map for the respective frame images, or the average value of the disparity map for the respective frame images as the amount of disparity in the processed images.

Here, as one example, the image processing unit 110 obtains the degree of depth of each pixel in the respective frame images described above by referring to information (data) showing the disparity of the each pixel calculated from the left-eye images and the right-eye images that construct the processed images. The disparity of each pixel shown by the information showing the disparity may be calculated by an apparatus that is external to the image processing apparatus 100, for example, or may be calculated by the control unit 102. Also, as described earlier, the image processing unit 110 is capable of obtaining the degree of depth of each pixel in the respective frame images described above by referring to the disparity information corresponding to the processed images, for example.

Also, as one example, the image processing unit 110 carries out adjustment to make the amount of disparity in each frame image larger based on the amount of change over time in the calculated amount of disparity. Here, as one example, by obtaining the output of an overshoot function that has the amount of disparity in each frame image as the input of the overshoot function as shown in Equation 2 described above, the image processing unit 110 makes the amount of disparity in each frame image larger based on the amount of change over time in the calculated amount of disparity. Also, as one example, the image processing unit 110 makes the amount of disparity in each frame image larger based on the amount of change over time in the calculated amount of disparity by selectively updating the output of the overshoot function as shown in Equation 4 above.

The image processing unit 110 then adjusts the degree of depth of each pixel in the respective frame images based on the adjusted amount of disparity in each frame image, for example. As examples, the image processing unit 110 adjusts the degree of depth of each pixel in the respective frame images by carrying out the calculation shown in Equation 3 above or Equation 5 above.

By including the image processing unit 110, for example, the control unit 102 takes the leading role in carrying out the processing in (1) above (the disparity amount calculating process) and the processing in (2) above (the disparity adjusting process).

Note that the configuration of the control unit according to the present embodiment is not limited to the configuration shown in FIG. 5. As one example, the image processing unit 110 may include a disparity adjusting unit (not shown) that takes the leading role in carrying out the processing in (1) above (the disparity amount calculating process) and the processing in (2) above (the disparity adjusting process).

By using the configuration shown in FIG. 5, for example, the image processing apparatus 100 carries out processing according to the image processing method according to the present embodiment (for example, the processing in (1) above (the disparity amount calculating process) and the processing in (2) above (the disparity adjusting process)).

Accordingly, by using the configuration shown in FIG. 5, for example, the image processing apparatus 100 is capable of adjusting disparity based on the processed images. Also, by using the configuration shown in FIG. 5, for example, the image processing apparatus 100 is capable of achieving the effects that can be achieved by using the image processing method according to the present embodiment described earlier.

Note that the configuration of the image processing apparatus according to the present embodiment is not limited to the configuration shown in FIG. 5.

For example, the image processing apparatus according to the present embodiment can include the image processing unit 110 shown in FIG. 5 separately to the control unit 102 (for example, such units can be realized by separate processing circuits). Also, the image processing apparatus according to the present embodiment may be separately equipped with a disparity amount calculating unit (not shown) that takes a leading role in carrying out the processing in (1) above (the disparity amount calculating process) and a disparity amount calculating unit (not shown) that takes a leading role in carrying out the processing in (2) above (the disparity adjusting process), for example.

Also, the image processing apparatus according to the present embodiment may further include a disparity estimating unit (not shown) that calculates the disparity of each pixel based on the left-eye image and the right-eye image that construct the processed images, for example. Here, in the case where a disparity estimating unit (not shown) is provided, in the image processing apparatus according to the present embodiment, as examples the control unit 102 may fulfill the role of the disparity estimating unit (not shown) or a processing circuit that is separate to the control unit 102 may fulfill the role of the disparity estimating unit (not shown).

Also, the image processing apparatus according to the present embodiment may further include a virtual viewpoint image generating unit (not shown) that generates a viewpoint image showing an image for one or two or more virtual viewpoints based on the processed images and on the degree of depth of each pixel in the respective frame images that have been adjusted by the image processing unit 110. Here, in the case where a virtual viewpoint image generating unit (not shown) is provided, in the image processing apparatus according to the present embodiment, as examples the control unit 102 may fulfill the role of the virtual viewpoint image generating unit (not shown) or a processing circuit that is separate to the control unit 102 may fulfill the role of the virtual viewpoint image generating unit (not shown).

Also, the image processing apparatus according to the present embodiment may further include a display control unit (not shown) that has the viewpoint images generated by the virtual viewpoint image generating unit (not shown) on a display screen, for example. As examples, the display control unit (not shown) displays the viewpoint images on at least one display screen out of a display screen of the display unit (not shown) and a display screen of an external display device connected via the communication unit (not shown). Here, in the case where a display control unit (not shown) is provided, in the image processing apparatus according to the present embodiment, as examples the control unit 102 may fulfill the role of the display control unit (not shown) or a processing circuit that is separate to the control unit 102 may fulfill the role of the display control unit (not shown).

Also, the image processing apparatus according to the present embodiment may include an image pickup unit (not shown), for example. In the case where an image pickup unit (not shown) is provided, as examples, the image processing apparatus according to the present embodiment can process the picked-up images generated by image pickup by the image pickup unit (not shown) as the processed images. An image pickup device according to the present embodiment described earlier can be given as an example of such image pickup unit (not shown).

As described above, the image processing apparatus according to the present embodiment carries out the processing in (1) above (the disparity amount calculating process) and the processing in (2) above (the disparity adjusting process) for example as the processing according to the image processing method according to the present embodiment. Here, in the processing in (2) above (the disparity adjusting process), the image processing apparatus according to the present embodiment adjusts the degree of depth of each pixel in the respective frame images by way of the calculation shown by Equation 3 and Equation 5 above, for example based on the amount of disparity in each frame image that has been adjusted based on the amount of disparity in each frame image calculated in the processing in (1) above (the disparity amount calculating process). As examples, the amount of disparity in each frame image that has been adjusted based on the amount of disparity in each frame image calculated in the processing in (1) above (the disparity amount calculating process) is the output value of an overshoot function such as that shown in Equation 2 above or the output value of an overshoot function that has been selectively updated by Equation 4 above, and is a value based on the amount of change over time in the magnitude of the disparity corresponding to the processed images.

Accordingly, the image processing apparatus according to the present embodiment is capable of carrying out adjustment to make the disparity larger than the disparity corresponding to the processed images.

Also, the image processing apparatus according to the present embodiment is capable of achieving the effects that can be achieved by using the image processing method relating to the present embodiment described earlier.

Although an image processing apparatus has been described above as an embodiment of the present disclosure, the present disclosure is not limited to such embodiment. The present disclosure can be applied to a variety of electronic appliances capable of processing moving images, such as a tablet-type apparatus, a communication apparatus such as a mobile phone or a smartphone, a video/music reproduction apparatus (or a video/music recording/reproduction apparatus), a game console, a computer such as a PC (Personal Computer), and an image pickup apparatus such as a digital camera or a digital video camera. As another example, the present disclosure can be applied to a processing IC (Integrated Circuit) that is capable of being incorporated in an electronic appliance such as those described above.

Program According to the Present Embodiment

A program for causing a computer to function as the image processing apparatus according to the present embodiment (for example, a program that is capable of executing processing according to the image processing method according to the present embodiment, such as the processing in (1) above (the disparity amount calculating process) and the processing in (2) above (the disparity adjusting process)) is capable, when executed by a computer, of carrying out adjustment to make the disparity larger than the disparity corresponding to the processed images.

By having a computer execute such program for causing a computer to function as the image processing apparatus according to the present embodiment, it is possible to achieve the effects that can be achieved by using the image processing method according to the present embodiment described earlier.

Although preferred embodiments of the present disclosure have been described in detail above with reference to the attached drawings, the technical scope of the present disclosure is not limited to such embodiments. It should be understood by those skilled in the art that various modifications, combinations, sub-combinations and alterations may occur depending on design requirements and other factors insofar as they are within the scope of the appended claims or the equivalents thereof.

For example, although the provision of a program (computer program) for causing a computer to function as the image processing apparatus according to the present embodiment has been described above, it is also possible to provide a recording medium storing such program according to an embodiment of the present disclosure.

The configurations described above are mere embodiments of the present disclosure and naturally belong to the technical scope of the present disclosure.

Additionally, the present technology may also be configured as below.

(1)

An image processing apparatus including:

an image processing unit configured to carry out adjustment that makes disparity larger than disparity corresponding to processed images, which are moving images to be processed, based on an amount of change over time in a magnitude of the disparity corresponding to the processed images.

(2)

The image processing apparatus according to (1), wherein the image processing unit is configured to calculate, for each frame image corresponding to each frame in the processed images, an amount of disparity showing the magnitude of disparity in the frame image, based on a degree of depth of each pixel relating to the disparity in the respective frame images, carry out adjustment that makes the amount of disparity in each frame image larger based on an amount of change over time in the amount of disparity, and adjust the degree of depth of each pixel in the respective frame images based on the adjusted amount of disparity in each frame image.

(3)

The image processing apparatus according to (2), wherein the image processing unit is configured to increase the amount of disparity in each frame image based on the amount of disparity in each frame image and an overshoot function, which is a function with the amount of disparity in each frame image as an input value, which holds an amount of change in the amount of disparity in an immediately preceding frame, and which causes convergence with the amount of disparity in each frame image as a target value.

(4)

The image processing apparatus according to (3), wherein the image processing unit is configured to calculate, for each frame image, a ratio of an output value of the overshoot function to the input value of the overshoot function, and adjust the degree of depth of each pixel in the respective frame images by multiplying, for each frame image, the degree of depth of each pixel in the frame image by the calculated ratio.

(5)

The image processing apparatus according to (4), wherein the image processing unit is operable when the output value of the overshoot function is smaller than the input value of the overshoot function, to selectively update the output value of the overshoot function to the input value of the overshoot function, and is configured to calculate, for each frame image, the ratio of the output value of the overshoot function that has been selectively updated to the input value of the overshoot function.

(6)

The image processing apparatus according to any one of (2) to (5), wherein the amount of disparity in each frame image is a dynamic range of the degree of depth in the respective frame images.

(7)

The image processing apparatus according to any one of (2) to (5), wherein the amount of disparity in each frame image is a maximum value of the degree of depth in the respective frame images.

(8)

The image processing apparatus according to any one of (2) to (5), wherein the amount of disparity in each frame image is an average value of the degree of depth in the respective frame images.

(9)

An image processing method including:

carrying out adjustment to make disparity larger than disparity corresponding to processed images, which are moving images to be processed, based on an amount of change over time in a magnitude of the disparity corresponding to the processed images.

(10)

A program causing a computer to execute adjustment that makes disparity larger than disparity corresponding to processed images, which are moving images to be processed, based on an amount of change over time in a magnitude of the disparity corresponding to the processed images.

(11)

An electronic appliance including:

an image processing unit configured to carry out adjustment that makes disparity larger than disparity corresponding to processed images, which are moving images to be processed, based on an amount of change over time in a magnitude of the disparity corresponding to the processed images.

What is claimed is:

1. An image processing apparatus operatively configured to:

over time, receive frames of stereo images;

calculate an amount of disparity for each frame of stereo images based on a degree of depth of each pixel in the frame of stereo images;

for each frame of stereo images, generate an adjusted amount of disparity based on an amount of change over time in the calculated amount of disparity; and for each frame of stereo images, generate a respective frame image with a degree of depth of each pixel adjusted based on the respective adjusted amount of disparity.

2. The image processing apparatus according to claim 1, wherein the image processing apparatus is configured to increase the amount of disparity in each frame image based on the amount of disparity in each frame image and an overshoot function, which is a function with the amount of disparity in each frame image as an input value, which holds an amount of change in the amount of disparity in an immediately preceding frame, and which causes convergence with the amount of disparity in each frame image as a target value.

3. The image processing apparatus according to claim 2, wherein the image processing apparatus is configured to:

calculate, for each frame image, a ratio of an output value of the overshoot function to the input value of the overshoot function, and adjust the degree of depth of each pixel in the respective frame image by multiplying, for each frame image, the degree of depth of each pixel in the frame image by the calculated ratio.

4. The image processing apparatus according to claim 3, wherein:

the image processing apparatus is operable when the output value of the overshoot function is smaller than the input value of the overshoot function, to selectively update the output value of the overshoot function to the input value of the overshoot function, and is configured to calculate, for each frame image, the ratio of the output value of the overshoot function that has been selectively updated to the input value of the overshoot function.

5. The image processing apparatus according to claim 1, wherein the amount of disparity in each frame image is a dynamic range of the degree of depth in the respective frame images.

6. The image processing apparatus according to claim 1, wherein the amount of disparity in each frame image is a maximum value of the degree of depth in the respective frame images.

7. The image processing apparatus according to claim 1, wherein the amount of disparity in each frame image is an average value of the degree of depth in the respective frame images.

8. An image processing method comprising:
over time, receiving frames of stereo images;
calculating an amount of disparity for each frame of stereo images based on a degree of depth of each pixel in the frame of stereo images;
for each frame of stereo images, generating an adjusted amount of disparity based on an amount of change over time in the calculated amount of disparity; and
for each frame of stereo images, generating a respective frame image with a degree of depth of each pixel adjusted based on the respective adjusted amount of disparity.

9. An electronic appliance comprising an image processing unit, the image processing unit operably configured to:
over time, receive frames of stereo images;
calculate an amount of disparity for each frame of stereo images based on a degree of depth of each pixel in the frame of stereo images;
for each frame of stereo images, generate an adjusted amount of disparity based on an amount of change over time in the calculated amount of disparity; and
for each frame of stereo images, generate a respective frame image with a degree of depth of each pixel adjusted based on the respective adjusted amount of disparity.

* * * * *